United States Patent
Lombardi (10) Patent No.: US 11,074,699 B2
(45) Date of Patent: Jul. 27, 2021

(54) METHOD FOR DETERMINING A PROTECTION RADIUS OF A VISION-BASED NAVIGATION SYSTEM

(71) Applicant: THALES, Courbevoie (FR)

(72) Inventor: Warody Lombardi, Valence (FR)

(73) Assignee: THALES, Courbevoie (FR)

( * ) Notice: Subject to any disclaimer, the term of this patent is extended or adjusted under 35 U.S.C. 154(b) by 67 days.

(21) Appl. No.: 16/737,852

(22) Filed: Jan. 8, 2020

(65) Prior Publication Data
US 2020/0226768 A1    Jul. 16, 2020

(30) Foreign Application Priority Data
Jan. 10, 2019    (FR) ...................................... 1900233

(51) Int. Cl.
*G06T 7/254*    (2017.01)
*G06T 7/246*    (2017.01)
*G01C 21/20*    (2006.01)

(52) U.S. Cl.
CPC .............. *G06T 7/248* (2017.01); *G01C 21/20* (2013.01)

(58) Field of Classification Search
CPC ....... G01C 21/165; G01C 21/20; G01S 19/49; A61B 1/2676; A61B 34/20; A61B 5/06; A61B 6/12; A61B 34/30; A61B 34/70; G06T 7/74; G06T 7/24; B25J 9/1694; H04W 4/024
See application file for complete search history.

(56) References Cited

U.S. PATENT DOCUMENTS

2016/0005164 A1*   1/2016   Roumeliotis .......... G01C 21/16
                                             348/116
2017/0314930 A1*   11/2017   Monterroza ......... G06N 3/0454

FOREIGN PATENT DOCUMENTS

WO      2018/026544 A1    2/2018

\* cited by examiner

*Primary Examiner* — Phuoc H Doan
(74) *Attorney, Agent, or Firm* — BakerHostetler (57) ABSTRACT

A method for determining a protection radius of a vision-based navigation system includes at least one image sensor able to produce at least one first image at a first instant and one second image at a second instant; and a processing unit coupled to each image sensor and able to implement a processing method able to determine at least one value of motion between the first instant and the second instant on the basis of the first image, of the second image and of a plurality of image data determined on the at least first and second images; the method comprising the following steps: a first step of determining at least one nominal value of uncertainty of the at least one motion value obtained by the processing method for a set comprising the plurality of image data determined; a second step of determining i-th sub-values of uncertainty of the at least one motion value determined by the processing method for an i-th subset defined by removing an i-th part of the image data determined; a third step of determining an i-th protection radius for the i-th subset on the basis of the i-th uncertainty sub-values and of the at least one nominal uncertainty value; the second and third steps being repeated for each i-th subset, i varying between 1 and a defined value M; a fourth step of determining a protection radius on the basis of the M i-th protection radii determined.

16 Claims, 4 Drawing Sheets

METHOD FOR DETERMINING A PROTECTION RADIUS OF A VISION-BASED NAVIGATION SYSTEM

CROSS-REFERENCE TO RELATED APPLICATIONS

This application claims priority to foreign French patent application No. FR 1900233, filed on Jan. 11, 2019, the disclosure of which is incorporated by reference in its entirety.

FIELD OF THE INVENTION

The invention lies in the field of vision-based navigation systems intended to be used to determine the displacement and/or the positioning of bodies in motion such as vehicles (automobiles, aeroplanes, etc.), drones, robots, portable devices, etc.

The invention relates more precisely to the issue of determining the integrity, defined by a protection radius, of a vision-based navigation system.

BACKGROUND

Among the known navigation systems are the satellite-based global navigation systems (known by the acronym "GNSS" for "Global Navigation Satellite System"), such as for example the global positioning system known by the acronym "GPS" (for "Global Positioning System"), which can be used to provide navigation information, for example, the position and the speed of a vehicle, of a robot, of a portable device, more generally of any body in motion or of any body whose position one wishes to know.

There are also inertia-based navigation systems (known by the acronym "INS" for "Inertial Navigation System") which are navigation systems embedded on board a carrier making it possible to gather information on the position of the carrier, the altitude, the attitude and the speed on the basis of inertial sensors, generally at least one acceleration sensor (accelerometer) and at least one rotation sensor (gyrometer). A drawback of inertia-based navigation systems resides in errors of the sensors when estimating the rotation and the acceleration (bias, drifts, noise, scale factors, non-linearity, alignment defects, etc.) which over time induce drifts in the position estimation.

Navigation systems can be used alone or combined together. It will be possible in this case to speak of hybrid systems. For example it will be possible to use an inertia-based system in addition to a satellite navigation system, notably to alleviate a loss of one or more satellites, or conversely to alleviate the drifts of the inertial navigation systems.

Despite this, navigation by the INS/GNSS hybrid system exhibits the drawback of being susceptible to phenomena which degrade its performance or which completely invalidate its use, such as the masking of satellites or the jamming of the signals emitted by the satellites, etc.

In fact, it is increasingly common to use vision-based navigation systems.

There are so-called "onboard" vision-based navigation systems which generally comprise at least one camera disposed on a body whose motion and/or position one wishes to know, for example a vehicle, a drone, a robot, a portable device. The body can be referred to as "carrier". Each camera is used to capture images which are thereafter processed by a computer so as to provide information on the speed, the trajectory of the carrier and/or on its position. The computer identifies characteristic points (or points of interest) on at least one image and matches the corresponding characteristic points between the images. Thus, the matching of the corresponding characteristic points between the images is used, for example, to determine a relative translation and/or rotation between the images.

There are also so-called "fixed" vision-based navigation systems for which the camera is not disposed on the body whose motion one wishes to know. In this case, each camera must sight the body in motion and the computer identifies characteristic points of the body in motion between the images.

Whether it be for an onboard or fixed system, it is therefore possible to use one or more cameras, or to use any other sensor able to produce images, for example a radar (it is possible in this case to speak of radar images) such as a synthetic aperture radar (SAR), or an IR sensor (it is possible in this case to speak of Infra-Red images).

This vision-based navigation technique can be referred to as "visual odometry" in the present description. Thus, on the basis of a simple sensor able to produce images, it is possible to extract information making it possible to obtain notably a translation and a rotation between at least two images, and to deduce the displacement and/or the position of a body in motion. An advantage of a vision-based navigation system is its stealth, and the fact that it cannot be masked or jammed.

Vision-based navigation can be used alone or in combination with another navigation system, for example with a satellite navigation system and/or with an inertia-based navigation system (one or more cameras and one or more inertial sensors can for example be disposed on a carrier).

In any navigation system, a major issue is to know the integrity of the said system. In the field of the invention, the integrity represents the degree of confidence that can be placed in the accuracy of the information provided by a navigation system. Additionally, the integrity can also represent the capacity to warn the user of a malfunction of the said system within a reasonable timespan.

In the case of a GNSS system or of a GNSS/INS hybrid, an event can occur, such as a failure of the said system, a jamming or a masking of a satellite. Such an event is generally manifested by the appearance of an error in the location information provided by the system, also referred to as a "positioning failure". In applications such as aviation where the reliability of the position information is crucial, such positioning failures of a navigation system absolutely must be managed.

The measurement of the integrity of a system is generally carried out by defining alert bounds. There is said to be a positioning failure when the difference between the body's actual position and that provided by the navigation system exceeds the defined alert bounds.

The alert bounds designate the maximum position errors that the system can make while complying with the integrity constraints. These bounds are defined for the horizontal and vertical position error: they are referred to respectively as "HAL" (for "Horizontal Alert Limit" in English) or "HPL" (for "Horizontal Protection Level" in English), as well as "VAL" (for "Vertical Alert Limit" in English) and "VPL" (for "Vertical Protection Level" in English). As regards the horizontal position error, it is also possible to speak of "protection radius".

The measurement of the integrity of a system can be supplemented with an alert time. The alert time or "TTA" (for "Time-To-Alert" in English) is the maximum time interval permitted between the instant at which the system no longer satisfies the operational demands of the type of operation and the instant at which the system indicates a navigation alert.

If the computation of the protection radius has been tackled for the case of GPS navigation, or else of hybridized inertia/GPS navigation, there is still no satisfactory method for determining a protection radius of a vision-based navigation system, notably on account of the nature of the measurements and of the computations which differ greatly between satellite-based navigation and vision-based navigation. Indeed, satellite navigation systems determine the positioning of a user possessing a GNSS receiver, on the basis of radioelectric waves emitted by satellites in orbit in space. The position of the satellites is known. The position of the receiver is computed by trilateration on the basis of the measurements of distance separating the user from the satellites in view of the receiver. In the case of vision-based navigation on the other hand, there is no emission of waves or emission of any other datum on behalf of the body in motion. Furthermore, in an onboard system, the position of the camera is not known (since specifically the position of the camera carrier is sought). Since the principle of vision-based navigation is entirely different from that of satellite-based navigation, it is not obvious, indeed it is impossible, to apply to a vision-based navigation system the methods for determining the protection radius that are used for a satellite system.

SUMMARY OF THE INVENTION

The invention is aimed at having a method for determining the integrity, and in particular to determine a protection radius for a vision-based navigation system.

In an advantageous manner, the invention is aimed at having a method making it possible to determine a protection radius in a precise manner.

In an advantageous manner, the invention is aimed at having a method which is simple to implement, fast and adaptable to any processing method of a vision-based navigation system, and any vision-based navigation system.

A first subject of the invention making it possible to achieve this aim is a method for determining a protection radius of a vision-based navigation system, the said system comprising:
  at least one image sensor able to produce at least one first image at a first instant and one second image at a second instant; and
  a processing unit coupled to each image sensor and able to implement a processing method able to determine at least one value of motion between the first instant and the second instant on the basis of the first image, of the second image and of a plurality of image data determined on the at least first and second images;
  the said method for determining a protection radius comprising the following steps:
  a first step of determining at least one nominal value of uncertainty of the at least one motion value obtained by the processing method for a set comprising the plurality of image data determined;
  a second step of determining i-th sub-values of uncertainty of the at least one motion value determined by the processing method for an i-th subset defined by removing an i-th part of the image data determined;
  a third step of determining an i-th protection radius for the i-th subset on the basis of the i-th uncertainty sub-values and of the at least one nominal uncertainty value; the second and third steps being repeated for each i-th subset, i varying between 1 and a defined value M;
  a fourth step of determining a protection radius on the basis of the M i-th protection radii determined.

The invention makes it possible to determine a protection radius for a vision-based navigation system. The precision of this determination depends on the number M and on the selection of the subsets, which can be determined as a function of the navigation system (and therefore of the processing method) implemented.

It is recalled that the protection radius designates the maximum error in horizontal position that the navigation system can commit: it can be referred to as "HAL" (for "Horizontal Alert Limit" in English) or "HPL" (for "Horizontal Protection Level" in English).

According to the invention, there is a protection radius per motion (a protection radius for translation and/or a protection radius for rotation).

More generally, the method according to the invention can be adapted as a function of the navigation system implemented, since the principle of the method is to compute uncertainties of the motion values obtained by the processing method (whatever the method). The mode of computing these uncertainties can be carried out in various ways, and the person skilled in the art working in the field of the invention will be able to adapt the mode of computing the uncertainties as a function of the processing method used. Modes of computation are given later in the detailed description, but are not limiting.

Furthermore, the principle of the method for determining a protection radius is simple and the swiftness of computation depends notably on the number of selected subsets (and therefore on the precision sought). The precision sought depends notably on the field for which the navigation system is intended.

Preferably, the fourth determination step is carried out by taking the largest from among the i-th protection radii determined. Stated otherwise, the protection radius is chosen as being the largest from among the i-th protection radii determined.

According to one embodiment, the third determination step comprises:
  a first sub-step of determining the i-th differences between the i-th uncertainty sub-values and the at least one nominal uncertainty value; and
  a second sub-step of determining an i-th standard deviation of the differences as being the largest value of standard deviation of the i-th differences;
  the i-th protection radius being determined on the basis of the i-th standard deviation of the differences.

According to one embodiment, the third determination step further comprises: a third sub-step of determining a corrected i-th standard deviation of the differences, as being the i-th standard deviation of the differences, multiplied by a first weighting constant; the i-th protection radius being determined on the basis of the corrected i-th standard deviation of the differences.

According to a particular embodiment, the value of the first weighting constant is obtained on the basis of the probability of false alarm of the vision-based navigation system, for example by using an inverse probability density function of the distribution.

According to one embodiment, the third determination step further comprises:

a fourth sub-step of determining an i-th standard deviation of the i-th subset as being the largest value of standard deviation of the i-th uncertainty sub-values;

the i-th protection radius being determined on the basis of a sum between the i-th standard deviation of the differences or the corrected i-th standard deviation of the differences and the i-th standard deviation.

According to one embodiment, the third determination step further comprises:

a fifth sub-step of determining an i-th corrected standard deviation, as being the i-th standard deviation multiplied by a second weighting constant;

the i-th protection radius being determined on the basis of a sum between the i-th standard deviation of the differences or the corrected i-th standard deviation of the differences and the i-th corrected standard deviation.

According to a particular embodiment, the value of the second weighting constant is obtained on the basis of the probability of non-detection of the vision-based navigation system, for example by using an inverse probability density function of the distribution.

According to one embodiment, the uncertainty values (including the sub-values) of at least one motion value obtained by the processing method are defined by a covariance matrix of the said motion value.

According to one embodiment, the uncertainty values of at least one motion value obtained by the processing method are determined by propagating the noise at the level of at least one from among the first and second images on the intermediate quantities required for the computation by the said processing method of the said motion value.

According to one embodiment, the method comprises a prior step of determining a covariance matrix of the at least one motion value obtained by the processing method, the said prior step comprising the following steps:

a first sub-step of characterizing a noise at the level of at least one from among the first and the second image so as to obtain a covariance matrix of the said noise; and at least one complementary sub-step of propagating the noise covariance matrix obtained on the said motion value, the said at least one complementary sub-step being able to propagate the covariance matrix of the noise on the intermediate quantities required for the computation of the at least one motion value by the processing method.

According to one embodiment, the processing method comprises the following steps:

a first step of acquiring at least one first and one second images further comprising the acquisition of at least one third image;

a second step of determining at least one intermediate value of motion between at least one first and one second image, comprising a sub-step of selecting points of interest which are common to the said first and second images;

a third step of determining points in space corresponding to points of interest which are common to the first and second images;

a fourth step of determining the at least one final motion value on the basis of the points in space determined and of points of interest in the at least one third image;

and the at least one complementary sub-step of propagating the covariance matrix of the noise on the motion value comprises:

a sub-step of propagating the covariance matrix of the noise at the at least one intermediate motion value;

a sub-step of propagating the covariance matrix of the at least one intermediate motion value at the points in the space;

a sub-step of propagating the covariance matrix of the points in space at the at least one final motion value.

According to one embodiment, at least one motion value is a rotation value and/or a translation value.

According to one embodiment, the image data comprise coordinates of a plurality of points of interest on at least the first and second images.

Unless indicated to the contrary, the various embodiments can be combined together.

A second subject of the invention relates to a processing method able to determine at least one value of motion between a first instant and a second instant on the basis of a first image taken at the first instant, of a second image taken at the second instant and of a plurality of image data determined on the at least first and second images, further comprising a method for determining a protection radius according to the invention.

A third subject of the invention also relates to a vision-based navigation system comprising:

at least one image sensor able to produce at least one first image at a first instant and one second image at a second instant; and a processing unit coupled to the image sensor and able to implement the processing method according to the invention.

According to the invention, "processing method" is defined as a method of image processing and of computation which is able to determine values of motion, for example of translation and/or of rotation, of a body on the basis of images acquired by at least one image sensor. The said image sensor can be either positioned at the level of the body in motion (hence "carrier"), or disposed so as to be able to sight the body in motion.

The vision-based navigation system can comprise one or more image sensors.

The images acquired by the image sensor or sensors provide image data.

The processing method is configured to utilize these image data. The image data can be obtained on the basis of characteristic image points which can be matched between at least two images. Throughout the description, characteristic image points such as these may be referred to as "points of interest".

Thus, when part of image data are removed, this can signify for example that no account is taken of one image sensor (typically of one or more images obtained on the basis of an image sensor), and/or of points of interest.

By "image point" is meant points or pixels of an image, therefore defined in a plane. They comprise two coordinates (in the plane of the image). Throughout the description, it will be possible to designate the image points as "2D" points.

On the other hand, "3D points" designates points in space and not only in a plane and which therefore comprise three coordinates.

According to the invention, the vision-based navigation system must be understood as integrating a processing method.

BRIEF DESCRIPTION OF THE DRAWINGS

Other characteristics and advantages of the invention will become apparent with the aid of the description which follows, given by way of nonlimiting illustration and with regard to the appended figures among which.

DETAILED DESCRIPTION

In the detailed description of the invention which follows, the invention is applied to a vision-based navigation system which is embedded onboard a carrier and which uses a monocular camera. The monocular vision system is less expensive in terms of hardware, as well as in terms of data acquisition and processing.

The wavelength, the frequency band, and other characteristics of the camera if relevant, can vary as a function of the specific implementation and specific mode of use of the said camera.

Any other suitably adapted image sensor can be used, for example a binocular camera, a light detection and telemetry sensor (LiDAR), a millimetre-waves radio detection and telemetry sensor (RADAR), or else an Infra-Red imager ("IR"). Several sensors can be combined.

The invention can alternately be applied to a fixed vision-based navigation system (instead of an onboard system).

The motions determined in the detailed description are the rotation and the translation and the vision-based navigation system is based on the points of interest. The image data comprise the coordinates on the image planes of these points of interest.

In the subsequent description, the rotation and/or translation determined on the basis of image points are designated by "2D-2D" rotation and/or translation. On the other hand, the rotation and/or translation determined on the basis of image points and of points in space are designated by "3D-2D" rotation and/or translation.

In practice, the final goal of the processing method described hereinafter is to determine a 3D-2D motion value, for example the 3D-2D rotation and/or translation, which is thus a final quantity, whilst a 2D-2D motion value, for example the 2D-2D rotation and/or translation, is an intermediate quantity required for the computation of the final quantity or quantities.

It should be understood that other embodiments can be used and notably that logical modifications can be made. Furthermore, the embodiments presented in the detailed description of the invention must not be interpreted as limiting the order of the steps and sub-steps. The detailed description which follows must not therefore be interpreted as limitative.

Figure 1:
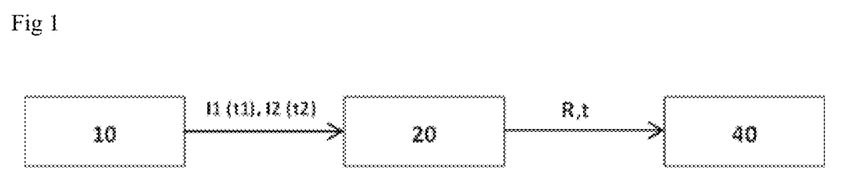
FIG. 1 represents a vision-based navigation system.

A vision-based navigation system generally comprises the elements illustrated in FIG. 1:

an image sensor 10 disposed on a carrier and making it possible to produce at least one first image I1 at a first instant t1 and one second image I2 at a second instant t2;

a processing unit 20 coupled to the image sensor 10 and able to implement a processing method able to compute a translation t and/or a rotation R of the carrier (or more generally a motion) between the first instant t1 and the second instant t2 on the basis of the first image I1 and of the second image I2;

a display unit 40 making it possible to display the translation t and the rotation R computed.

The processing method can be in the form of an algorithm and can also be referred to for simplicity as "vision-based navigation algorithm" or "vision algorithm" in the present description.

Figure 8:
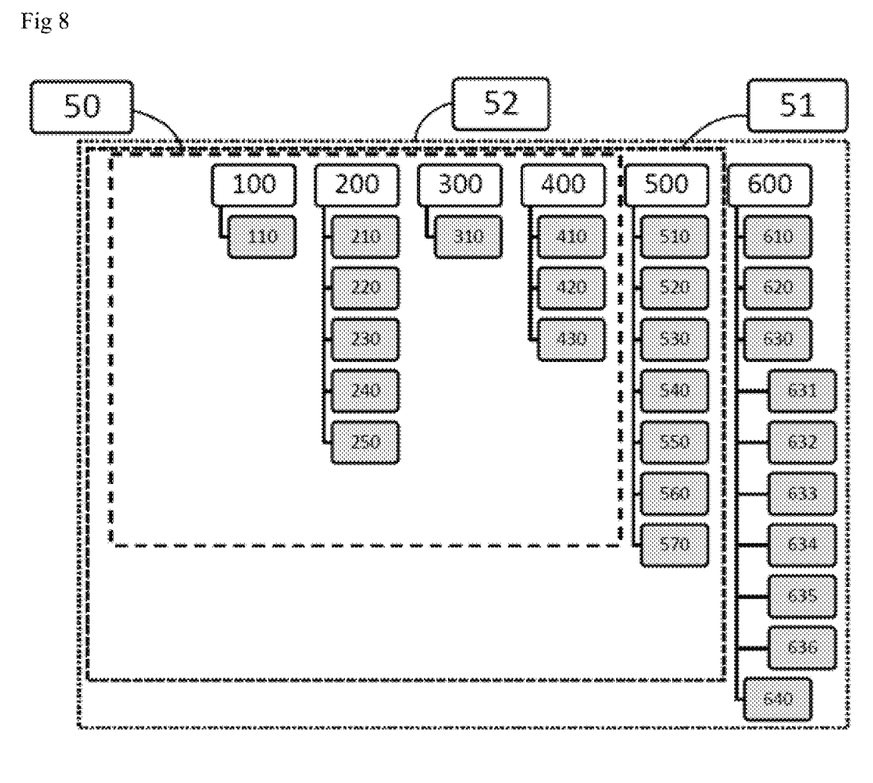
FIG. 8 illustrates in logic diagram form an exemplary vision algorithm including an exemplary method for determining a protection radius.

The processing method 50 comprises the following steps, illustrated notably in FIG. 8:

a first step 100 of acquiring and/or processing at least one first image I1 taken at a first instant t1 and one second image I2 taken at a second instant t2;

a second step 200 of determining the intermediate rotation and intermediate translation between the first image I1 and the second image I2 ("2D-2D" rotation and translation);

a third step 300 of obtaining first 3D points on the basis of the first and second images;

a fourth step 400 of determining the final rotation and final translation on the basis of the first 3D points obtained and of a third image I3 taken at a third instant t3 ("3D-2D" rotation and translation).

The first step 100 of acquiring and/or processing the images can be carried out before the second step 200 and can also be carried out before the fourth step 400. More generally it can be carried out several times and/or at any moment in the course of the processing method. It makes it possible to acquire at least one first and one second image, and can also allow the acquisition of at least one third image.

The first step 100 can comprise a sub-step 110 of correcting the radial and/or tangential distortions of at least the first and second images. Indeed, since the images pass through a lens before arriving at the sensor, radial and tangential distortions can occur. It is therefore desirable to identify these distortions and to correct them before using the images for navigation purposes. This step can also be referred to as the camera "calibration" step. In practice, this calibration step consists of the acquisition of images comprising calibration points whose coordinates in three dimensions are known, to which a rotation and a translation are applied. It is possible to use a chequerboard image, since the intersections between the white and black squares are easily identifiable and therefore known and can furthermore form perfectly straight lines. In this case, an algorithm is used which identifies the parameters of the polynomial passing through the intersections and generates a correction to be applied to the images. It is possible to use for example the algorithm "camera calibration toolbox for Matlab" by J. Y. Bouguet, which is easy to use.

The second step 200 comprises a first sub-step 210 for the selection of points of interest. Indeed, to be able to process the images, it is possible to select points of interest which, as has been defined above, are characteristic image points that lie at least in the first and the second image, but which are generally offset on account of the displacement between the two images. The points of interest are matched between the said images so as to be compared, with the aim of obtaining the most precise possible values of rotation and translation. Numerous methods exist for selecting points of interest in an image: for example the method "Scale Invariant Feature Transform" ("SIFT"), or "Speeded Up Robust Features" ("SURF")", "Binary Robust Independent Elementary Features" ("BRIEF"), "Oriented Fast and Rotated Brief" ("ORB"), "Center Surround Extremas" ("CENSURE"), or else the Harris algorithm, etc.

Figure 3:
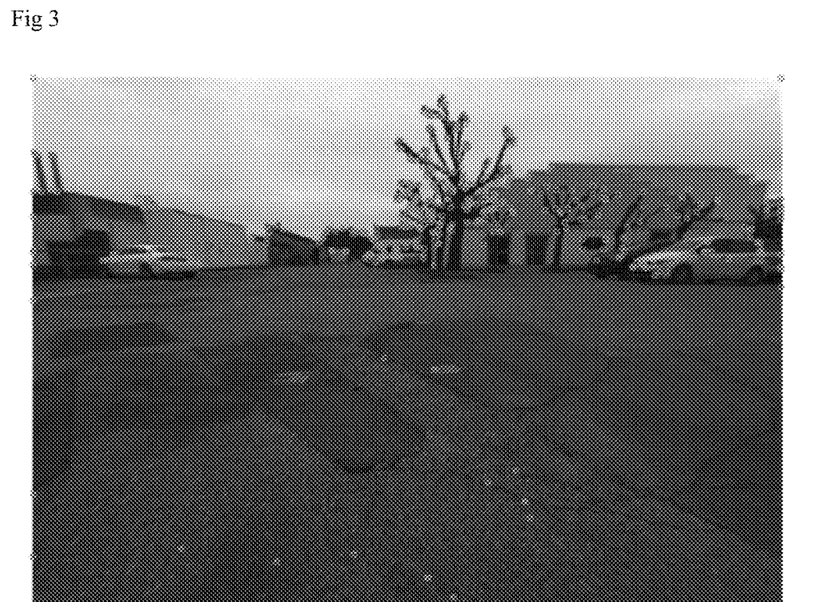
FIG. 3 represents an image processed with a Harris algorithm to determine points of interest.

In a preferred embodiment, the first sub-step 210 of selecting the points of interest comprises the use of the Harris algorithm, for its compromise between swiftness, precision, and robustness. The Harris algorithm relies on the principle of detecting corners and edges. Each pixel of the image is evaluated as a function of its neighbourhood, and if a pixel has sufficient contrast with respect to the surrounding pixels (according to a threshold fixed by the user), the said pixel is retained as a "point of interest". FIG. 3 shows an exemplary image processed with the Harris algorithm, manifesting the points of interest. It is possible to limit the number of points of interest, for example to a value of the order of 1000 points maximum.

Preferably, the second step 200 can comprise a second sub-step 220 of normalizing the pixels between the first and the second image, for example with the aid of an averaging filter as follows:

$$\hat{I1} = \frac{I1 - \overline{I1}}{\|I1 - \overline{I1}\|} \quad \text{[Math. 1]}$$

Where I1 is the set of pixels of the first image, $\overline{I1}$ is the average value of the pixels of the first image after applying the averaging filter and $\hat{I1}$ is the normalized image.

$$\hat{I2} = \frac{I2 - \overline{I2}}{\|I2 - \overline{I2}\|} \quad \text{[Math. 2]}$$

Where I2 is the set of pixels of the second image, $\overline{I2}$ is the average value of the pixels of the second image after applying the averaging filter and $\hat{I2}$ is the normalized image.

Instead of normalizing all the pixels of the image, it is alternatively possible to apply the normalization solely to pixels around the points of interest.

The second step 200 comprises a third sub-step 230 of correlating between the first and second images, preferably normalized according to the second sub-step 220, which makes it possible to correlate the points of interest between the two images.

The correlation is carried out for example with the aid of the operator hereinbelow which must be carried out around the indices k and l:

$$C(k,l) = \Sigma_j \Sigma_i \hat{I1}(i,j) \hat{I2}(i-k, j-l) \quad \text{[Math. 3]}$$

Where i, j is the pixel at the ith row and jth column of the image, and k and l are the indices of the correlation matrix, where the correlation is carried out in a window of size w (in pixels) centred on k and l and determined by the user.

Figure 4:
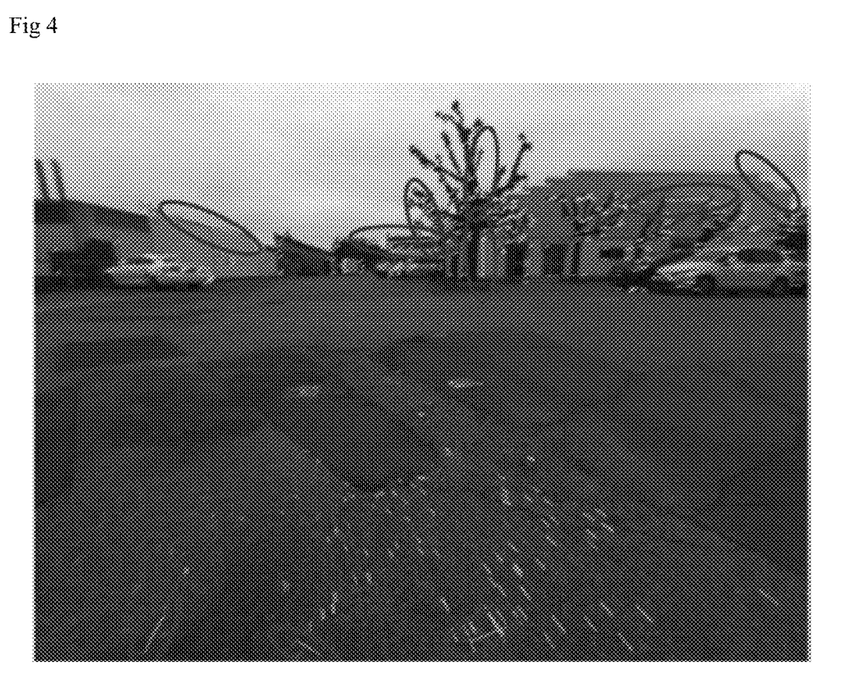
FIG. 4 represents a correlation carried out between two images.

The result in FIG. 4 is for example obtained. Certain points are not well correlated (points surrounded in the figure). Preferably, the uncorrelated or poorly correlated points must be eliminated. An exemplary method used to carry out this elimination is explained further (on fifth sub-step 250).

The second step 200 comprises a fourth sub-step 240 which utilizes at least one mathematical relation between the first image I1 taken at the first instant t1 and the second image I2 taken at the second instant t2, making it possible to give information on the rotation and translation of the image sensor between the two snapshots.

A first mathematical relation is the fundamental matrix $F \in \Re^{3 \times 3}$. A fundamental matrix possesses the intrinsic parameters of the camera as well as its rotation R and its translation t. The fourth sub-step 240 can comprise a step of determining the fundamental matrix.

Figure 5:
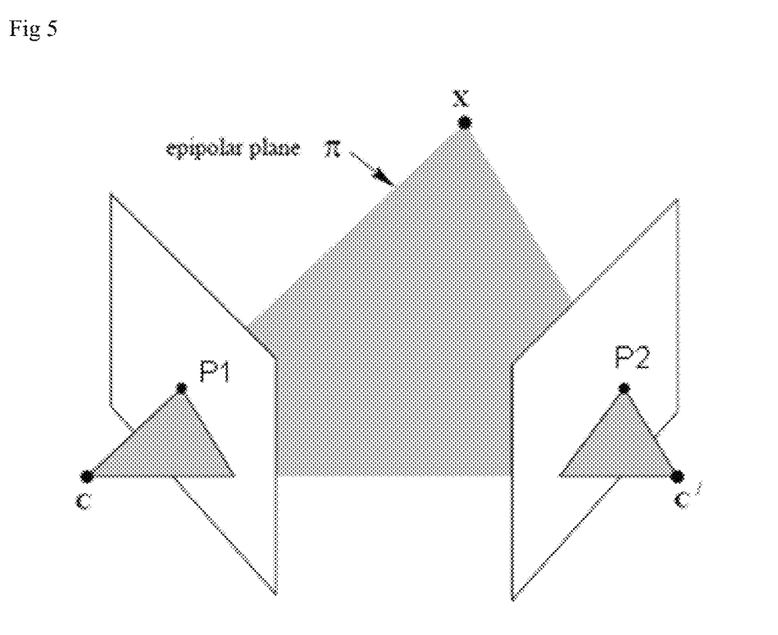
FIG. 5 illustrates the epipolar geometry.

The fundamental matrix is based on the properties of the epipolar geometry between the two images, the epipolar geometry being defined as the set of projective relations between two images. If we take a point X in space (or "3D point") seen by two images I1 and I2, its projection in the first image I1 is given by P1 and its projection in the second image is given by P2, as illustrated by FIG. 5. C represents the centre of the camera at the first instant t1 and C' the centre of the camera at the second instant t2 (in the case where a sole camera moves with the carrier). The epipolar geometry establishes that the points X, P1, P2, C, C' are coplanar (epipolar plane π).

The fundamental matrix F must satisfy the following relation, referred to as the "fundamental relation":

$$P2^T F P1 = 0 \quad \text{[Math. 4]}$$

This relation makes it possible to determine the fundamental matrix.

The points P1 and P2 correspond to one and the same point of interest (one is on the first image I1 and the other on the second image I2). Such points may be known. The fundamental relation is satisfied if the points are correlated. The points P1 and P2 are characterized by their coordinates x1, y1 and x2, y2 in the plane of the first image I1 and of the second image I2. By expressing these points in the form of vectors: $P1 = [x_1 \ y_1 \ 1]^T$ and $P2 = [x_2 \ y_2 \ 1]^T$, we obtain:

$$\begin{bmatrix} x_2 \\ y_2 \\ 1 \end{bmatrix}^T \begin{bmatrix} f_{11} & f_{12} & f_{13} \\ f_{21} & f_{22} & f_{23} \\ f_{31} & f_{32} & f_{33} \end{bmatrix} \begin{bmatrix} x_1 \\ y_1 \\ 1 \end{bmatrix} = 0 \quad \text{[Math. 5]}$$

Formula [Math.5] amounts to solving a system of several linear equations in the form $A_F f = 0$ where $A_F$ is the matrix of the linear system used to find f. The solution f must minimize $\|A_F f\|$ subject to the condition $\|f\| = 1$.

This system of several linear equations can be solved using several known points of interest, for example using eight points of interest (and this may be referred to as an "8-point algorithm").

In practice, among the points of interest, some are not well correlated between the first and the second image. These points of interest will not necessarily comply with the fundamental relation. It is preferable to eliminate these points termed "outlier points" (or "outliers"), or at least not to use them to solve the system with several equations arising from [Maths.5]. The fundamental matrix obtained by eliminating the outlier points is more precise. This makes it possible to improve the precision of determining the rotation and translation.

Thus, the second step 200 can comprise a fifth sub-step 250 of eliminating outlier points. This fifth sub-step 250 can be carried out before, during or after the fourth sub-step 240. It can also be carried out more broadly during the second step, or indeed more broadly during all the steps.

The fifth sub-step 250 can implement a method of "RANSAC" type which corresponds in English to "RANdom SAmpling Consensus" which is a method for estimating the parameters of certain mathematical models, above all when the error induced by a model does not exhibit a Gaussian distribution. Indeed, it is an iterative method used when the set of observed data may contain outlier values (or "outliers").

In the case of RANSAC applied to the obtaining of the fundamental matrix, a certain number of points of interest is chosen, for example eight points at random.

The fundamental matrix F is determined with these randomly chosen points of interest. Thereafter, the fundamental matrix determined F is used to compute the distance d(F), which is the fundamental relation but which is non-zero since the points are not correlated:

$$d(F) = P2^T F P1 \qquad \text{[Math. 6]}$$

This distance is computed for the set of points of interest. If the distance is smaller than a predefined threshold d(F) max, the point of interest is considered to be correlated ("inlier"), otherwise the point of interest is considered to be uncorrelated, or aberrant ("outlier").

Thereafter, new points of interest are taken randomly, for example eight points at random, and the operations described in the previous three paragraphs are repeated: the new fundamental matrix F is computed and the new distances d(F) are computed.

The operation of the previous paragraph is preferably repeated several times. By carrying out this iterative repetition, a fundamental matrix is obtained which minimizes the distance for the largest number of points of interest. It is possible to fix a maximum number of iterations and/or a number of points of interest to be selected and/or to stop the iterations when it is estimated that the fundamental matrix obtained is satisfactory.

Figure 6:
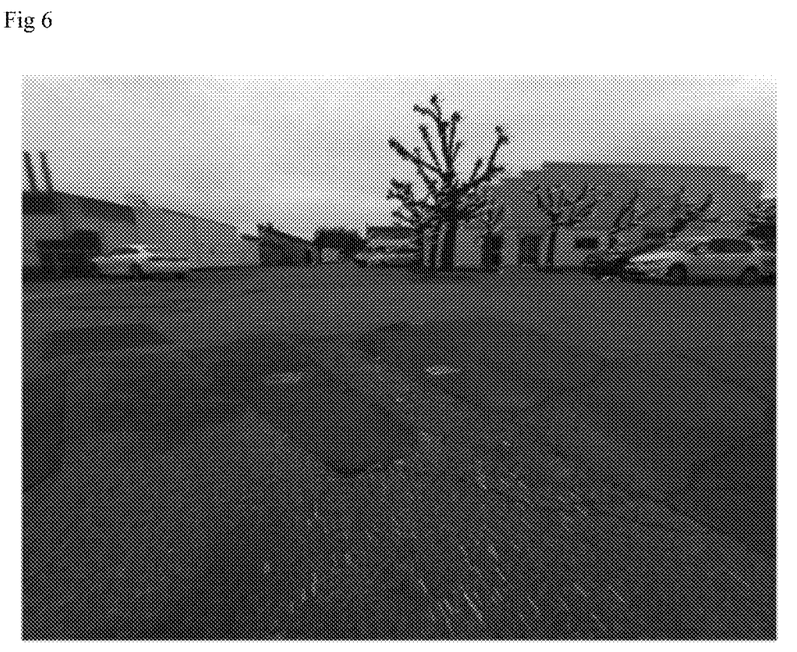
FIG. 6 represents the correlation of [FIG. 4], uncorrelated points being eliminated.

The result in FIG. 6 is for example obtained, numerous outlier points having disappeared from the image.

A second mathematical relation is the essential matrix E which can be obtained on the basis of the camera's calibration matrix K. This makes it possible to obtain a projective model of the camera. The fourth sub-step 240 can comprise a step of determining the fundamental matrix and then a step of determining the essential matrix. Alternatively, the fourth sub-step 240 can comprise a step of direct determination of the essential matrix. The RANSAC method, or another method for eliminating outlier points, can be applied to the obtaining of the essential matrix.

The camera's calibration matrix K is a matrix intrinsic to the camera. It contains the parameters of the camera, such as the focal length f and the planar coordinates (px, py, 1) of the centre of the image:

$$K = \begin{bmatrix} f & & p_x \\ & f & p_y \\ & & 1 \end{bmatrix} \qquad \text{[Math. 7]}$$

The essential matrix E is computed through the relation:

$$E = K^T F K \qquad \text{[Math. 8]}$$

Moreover, the essential matrix E is defined as being the following vector product:

$$E = t_{2Dx} R_{2D} \qquad \text{[Math. 9]}$$

Where $t_{2Dx}$ is the antisymmetric matrix of the vector of 2D-2D translation t2D between two images and R2D is the 2D-2D rotation between two images.

The essential matrix E thus possesses in an intrinsic manner the information of the 2D-2D rotation R2D and of the translation t2D between the two images. On the basis of relation [Math. 9] it is possible to extract the rotation and the translation in the plane, that is to say without the depth (i.e. without the "z" dimension).

The rotation and translation thus determined can be referred to as the "intermediate rotation" and the "intermediate translation" in the present description (and more generally of "intermediate motion" if one speaks of motion).

The third step 300 makes it possible, once the intermediate rotation and the intermediate translation between the first and second images have been obtained, to obtain the points in three dimensions, typically by triangulation. This third step makes it possible to obtain the coordinates in 3D of the points of interest whose projections on the first and second images have been compared, with a given scale factor. It is possible to correct the scale factor.

An interesting property of the epipolar geometry illustrated in FIG. 5 and in the corresponding paragraph of the description, as well as a direct consequence of the fundamental relation is the following: if the formula [Math.4] is complied with, that is to say if $P2^T F P1=0$, then the point X (point in 3 dimensions or "3D point") and the points P1, P2 (points of projection on the first and second images I1 and I2) are coplanar. Let us assume the matrices $C_1 = K[I \; 0]$ and $C_2 = K[R_{2D} \; t_{2D}]$, referred to as "camera matrices", where I is the identity matrix, this implies the following relations (zero vector products).

$$P1 \wedge C_1 X = 0 \qquad \text{[Math. 10]}$$

$$P2 \wedge C_2 X = 0 \qquad \text{[Math. 11]}$$

These relations make it possible to obtain the points X on the basis of the points of projections P1 and P2 on the first and second images I1 and I2 and on the basis of the 2D-2D rotation and translation determined between the said first and second images (P1 and P2 being correlated).

By repeating this computation for all or some of the points of interest correlated between the first and second images, all the 3D points (points X) are reconstructed and consequently it is possible to go on to reconstruct in 3D all or part of the scene captured by the images.

The 3D points thus obtained by this first triangulation are referred to in the subsequent description as "first 3D points".

The third step 300 can furthermore comprise a sub-step 310 of eliminating outlier points, using for example the RANSAC method.

The objective of the fourth step 400 is to determine the rotation and the translation between the first 3D points X and points of interest in a third image.

In the second step 200, two images have been used, and the 2D-2D translation and rotation values are determined by comparing points of interest between the two images. Next in the third step 300, the first 3D points have been obtained on the basis of the points of interest and of the 2D-2D translation and rotation values determined in the second step. The problem is that to utilize visual odometry in the case of vision-based navigation, it is not enough to compare two images and to obtain just a translation and a rotation between two images. Indeed it is desired to follow the carrier over a given time interval which corresponds to (many) more than two images. Thus, vision-based navigation requires the acquisition of new images that must be placed into relation with the 2D-2D translation and rotation values determined and the first 3D points obtained. Furthermore, the scale factor of the rotation and of the translation that were estimated in 2D-2D varies at each new image added to obtain a new estimation, rendering its use impossible for navigation purposes.

The fourth step makes it possible to preserve one and the same scale factor when a third image is added to estimate the final rotation and translation values. It thus makes it possible to have a more stable estimation of the rotation and of the translation of the carrier.

The fourth step 400 comprises a first sub-step 410 able to determine second 3D points on the basis of the first 3D points obtained and points of interest in a third image I3.

The first sub-step 410 can consist in solving the so-called "P3P" problem ("P3P" from the English "perspective-3-point"), or more broadly in solving the "PnP" problem ("PnP" from the English "perspective-n-point").

To solve the "P3P" problem, the principle is to determine the distance between the first 3D points and the centre of the camera. Having determined these distances, and on the basis of the points of interest tagged in a third image I3 in relation at least with the second image I2 (or with the first image I1), it is possible to deduce second 3D points and obtain the rotation and the translation of the second 3D points with respect to the first 3D points.

The first 3D points are represented by $X_i$ and the second 3D points are represented by $\tilde{X}_i$ (i varies between 1 and 3 for a P3P problem, and between 1 and n for a PnP problem). The points of interest in the third image I3 are represented by $P3_i$. The distance di is the distance between the point $X_i$ and the camera C. The PnP problem therefore consists in determining each distance $d_i$.

By way of example, the P3P problem can therefore consist in solving the following system of equations:

$$\begin{cases} d_1^2 + d_2^2 - 2d_1 d_2 \cos\theta_{12} = d_{12}^2 \\ d_1^2 + d_3^2 - 2d_1 d_3 \cos\theta_{13} = d_{13}^2 \\ d_2^2 + d_3^2 - 2d_2 d_3 \cos\theta_{23} = d_{23}^2 \end{cases} \quad \text{[Math. 12]}$$

Where $d_1=\|C-X_1\|$, $d_2=\|C-X_2\|$, $d_3=\|C-X_3\|$, $\theta_{12}=\widehat{X_1CX_2}$, $\theta_{13}=\widehat{X_1CX_3}$ and $\theta_{23}=\widehat{X_1CX_3}$, $d_{12}=\|X_1-X_2\|$, $d_{13}=\|X_1-X_3\|$ and $d_{23}=\|X_2-X_3\|$.

The angles $\theta_{12}$, $\theta_{13}$ and $\theta_{23}$ are obtained on the basis of the camera calibration matrix K and of the points $P3_1$, $P3_2$, $P3_3$ in the third image:

$$\cos\theta_{12} = \frac{(K^{-1}P3_1)^T(K^{-1}P3_2)}{\|K^{-1}P3_1\|\|K^{-1}P3_2\|} \quad \text{[Math. 13]}$$

$$\cos\theta_{13} = \frac{(K^{-1}P3_1)^T(K^{-1}P3_3)}{\|K^{-1}P3_1\|\|K^{-1}P3_3\|} \quad \text{[Math. 14]}$$

$$\cos\theta_{23} = \frac{(K^{-1}P3_2)^T(K^{-1}P3_3)}{\|K^{-1}P3_2\|\|K^{-1}P3_2\|} \quad \text{[Math. 15]}$$

Alternatively, a P5P method can be used to obtain five distances di with 5 points in the third image by using a system $A_d$ of several linear equations:

$$\begin{bmatrix} a_1^1 & a_2^1 & a_3^1 & a_4^1 & a_5^1 \\ a_1^2 & a_2^2 & a_3^2 & a_4^2 & a_5^2 \\ \vdots & \vdots & \vdots & \vdots & \vdots \\ a_1^5 & a_2^5 & a_3^5 & a_4^5 & a_5^5 \end{bmatrix} \begin{bmatrix} 1 \\ d_1 \\ d_1^2 \\ d_1^3 \\ d_1^4 \end{bmatrix} = A_d d = 0 \quad \text{[Math. 16]}$$

Where the coefficients $a_i^j$ of the matrix $A_d$ are dependent on $d_{ij}$ and on $\cos\theta_{ij}$ where i and j vary from 1 to 5.

On the basis of the decomposition of the matrix $A_d$ into singular values $A_d = USV^T$, the solution d is given by:

$$d = V(:,5). \quad \text{[Math. 17]}$$

$d_1$ is found from the relations:

$$d_1 = \sqrt{d(2)/d(1)} \text{ or } \sqrt{d(3)/d(2)} \text{ or } \sqrt{d(4)/d(3)} \text{ or } \sqrt{d(5)/d(4)}. \quad \text{[Math. 18]}$$

The same is done for the other points to find $d_2$, $d_3$, $d_4$ and $d_5$.

Once the PnP problem has been solved and therefore the distances di found, the second 3D points $\tilde{X}_i$ can be determined on the basis of the points $P3_i$ of the third image I3, the said second 3D points being given by the formula:

$$\tilde{X}_i = d_i \frac{K^{-1}P3_i}{\|K^{-1}P3_i\|} \quad \text{[Math. 19]}$$

where K is the calibration matrix of the camera.

Numerous methods exist for solving the P3P problem, and more broadly the PnP problem. Most of them rely on eliminating the unknowns through a Sylvester resultant and thereafter by solving a system of linear equations.

The fourth step 400 furthermore comprises a second sub-step 420 which consists in the determination of the R3D rotation and the 3D-2D translation $t_{3D}$ between the first 3D points $X_i$ and the second 3D points $\tilde{X}_i$.

This determination can be carried out using a method known by the name of the "Procustes problem". The Procustes problem is a minimization problem which consists in solving the following equation:

$$\min_{R,t}\|R_{3D}\tilde{X}_i + t_{3D} - X_i\|^2 \quad \text{[Math. 20]}$$

while complying with the following two constraints:

$$R_{3D}^T R_{3D} = R_{3D} R_{3D}^T = 1 \quad \text{[Math. 21]}$$

I being the identity matrix; and $$\det(R_{3D}) = 1 \quad \text{[Math. 22[}$$

The fourth step 400 can furthermore comprise a third sub-step 430 of eliminating outlier points, more precisely so as to obtain 3D-2D values of rotation $R_{3D}$ and of translation $t_{3D}$ which are appropriate for the largest number of points of interest, and which are therefore more precise.

The third sub-step 430 can comprise for example the use of a method of "RANSAC" type which consists in minimizing the distance, for each image point P (which corresponds to a projection on an image of a point X in 3D), between the point $P_{mes}$ measured on an image and the point $P_{est}$ estimated by the vision algorithm (by using the 3D-2D values of rotation $R_{3D}$ and of translation $t_{3D}$ obtained), i.e. for example in minimizing:

$$d(R, t) = \sum (P_{mes} - P_{est})^2 \quad \text{[Math. 23]}$$

with $P_{mes} = K^{-1}P$ where $K$ is the calibration matrix of the camera [Math. 24]

$$P_{mes} = \frac{P_{mes}}{\|z_{mes}\|} \text{ making it possible to normalize} \quad \text{[Math. 25]}$$

the value of $P_{mes}$ to a depth equal to 1

$P_{est} = K[R_{3D} \ t_{3D}]X$ where $K$ [Math. 26]

is the calibration matrix of the camera $$P_{est} = \frac{P_{est}}{\|z_{est}\|} \text{ making it possible to} \quad \text{[Math. 27]}$$

normalize the value of $P_{est}$ to a depth equal to 1

The fourth step 400 therefore makes it possible to obtain the rotation and the translation of the camera on the basis of a third image and of the first 3D points computed for the first and second images.

The rotation and the translation thus determined (also designated by "3D-2D" rotation and translation) can be referred to as "final rotation" and "final translation" in the present description (and more generally "final motion" if one speaks of motion).

Thereafter, it is possible to carry out an additional triangulation step (on the basis of the second and third correlated images, of the rotation and of the translation obtained in 3D-2D), so as to redefine second 3D points, and then an additional step of determining the rotation and the translation between the second 3D points and points of interest in a fourth image I4 by solving a new PnP. More generally, it is possible to reproduce additional triangulation and PnP steps in an iterative manner during the acquisition of new images so as each time to estimate the rotation and the translation. Indeed, in tandem with the motion of the camera carrier and the acquisition of new images, the points of interest which are common to all the images decrease, until none exist (the scene viewed by the camera will evolve). To be able to continue to follow the motion, it is necessary to add points of interest which are common to the latest acquired images (and therefore more necessarily common to the previously acquired images), and arrange to have a scale factor consistent with the previous images.

The second step of determining the 2D-2D rotation and the translation is in fact used just to initialize the computation, since from the moment at which first final values of 3D-2D rotation and translation have been determined, on completion of the fourth step, we will use these first values in a first iteration, and then we will use the 3D-2D rotation and translation values obtained for a next iteration, and so on and so forth.

Thus this makes it possible to follow the motion of the carrier of the camera in tandem with the image captures.

Figure 2:
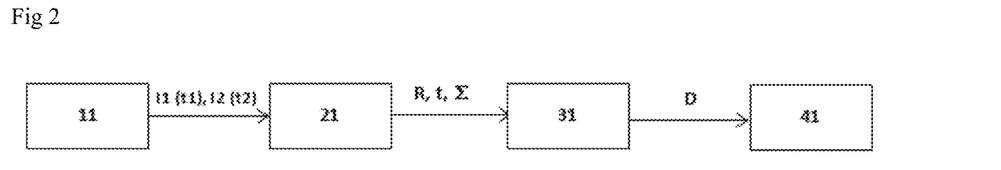
FIG. 2 represents a vision-based navigation system integrating an integrity computer.

An exemplary vision-based navigation system integrating an integrity computer of the said system comprises the elements illustrated in FIG. 2:

an image sensor 11 disposed on a carrier and making it possible to produce at least one first image I1 at a first instant t1 and one second image I2 at a second instant t2;

a processing unit 21 coupled to the image sensor 11 and able to implement a processing method able to compute a translation t and/or a rotation R of the carrier (or more generally a motion) between the first instant t1 and the second instant t2 on the basis of the first image I1 and of the second image I2;

an integrity computation module 31 coupled to the processing unit 21 and making it possible to compute a protection radius D;

a display unit 41 making it possible to display the translation t and the rotation R computed as well as the protection radius D;

The integrity computation module 31 can be integrated into the processing unit, or can be separate.

Furthermore, it should be understood that, although a single processing unit 21 is represented in FIG. 2, the processing unit 21 can comprise several processors, each processor being charged with executing a particular task. The same goes for the integrity computation module.

The processing unit 21 and/or the integrity computation module 31 include or operate with software programs or other instructions readable by computer to execute the steps and sub-steps of the processing method and/or of the method for determining the protection radius.

The processing method 51 implements at minimum the same steps as those described previously notably with reference to FIG. 8, namely:

a first step 100 of acquiring and/or processing at least one first image I1 taken at a first instant t1 and one second image I2 taken at a second instant t2;

a second step 200 of determining the intermediate rotation and intermediate translation between the first image I1 and the second image I2 ("2D-2D" rotation and translation);

a third step 300 of obtaining first 3D points on the basis of the first and second images;

a fourth step 400 of determining the final rotation and final translation on the basis of the first 3D points obtained and of a third image I3 taken at a third instant t3 ("3D-2D" rotation and translation).

Furthermore, all the sub-steps described previously can apply to an exemplary vision-based navigation system integrating an integrity computation unit.

Furthermore, the processing method 51 can comprise:

a fifth step 500 of computing the uncertainty induced by a noise at the level of one from among the first or the second image on the final rotation and/or translation.

By "noise" should be understood the random variations or "small errors" which get added during the acquisition of an image by an image sensor. Indeed, during the acquisition of a physical measurement on the basis of a sensor, defects get added to the measured quantity.

The principle is to characterize the noise at the level of an image, typically to determine its standard deviation σ, and then to propagate the uncertainty induced by this noise on the intermediate quantities required for the determination of the final rotation and/or of the final translation in such a way as to determine the uncertainties in the final rotation and/or translation values.

Typically, the uncertainty induced by the noise is propagated on the intermediate quantities which are determined during the course of the steps and sub-steps of a processing method (vision algorithm) so as to determine the uncertainties in the final rotation and/or translation values obtained.

As illustrated in FIG. 2, the processing unit 21 can implement these steps of propagating the noise in such a way as to obtain the uncertainties Σ.

An uncertainty is preferably defined by the covariance. In particular, an uncertainty can be determined in the form of a covariance matrix.

An embodiment of the fifth step 500 is described hereinafter, notably with reference to FIG. 8.

According to this embodiment of the fifth step, the uncertainty induced and propagated is determined in the form of a covariance matrix of the rotation and of a covariance matrix of the translation.

Other methods are possible. Thus, instead of computing the uncertainty in the form of covariance, it can be computed through the residual of the solution, for example the residual of a least squares solution.

The term "fifth" step does not imply that the said step necessarily occurs after the other steps. Thus, the said fifth step can comprise several sub-steps some of which can be implemented before, during or after one or the other of the sub-steps of the second, third and fourth steps described above.

For example, still with reference to the steps described above in the present description, we propagate the uncertainty induced by the noise on the intermediate rotation and the intermediate translation (2D-2D), and then we propagate the uncertainty induced by the intermediate rotation and the intermediate translation on the first 3D points generated by triangulation, and then we propagate the uncertainty induced by the first 3D points on the second 3D points generated by a P3P or PnP algorithm, and finally we propagate the uncertainty induced by the second 3D points on the final rotation and the final translation (3D-2D).

The fifth step 500 can comprise a first sub-step 510 of characterizing the noise at the level of at least one from among the first and the second image. This makes it possible to obtain for example a covariance matrix for the noise.

When the computation of the intermediate rotation and of the intermediate translation is based on the determination of the fundamental matrix F and/or of the essential matrix E, as is described above in the present description, the fifth step 500 can comprise a second sub-step 520 of determining the propagation of the noise to the fundamental matrix F and/or to the essential matrix E. The second sub-step can in particular be carried out by determining the covariance of the fundamental matrix F and/or the covariance of the essential matrix E.

By way of example, let $\Sigma_\sigma$ be the noise covariance matrix at the level of the points which was obtained on completion of the first sub-step 510:

$$\Sigma_\sigma = \begin{bmatrix} \sigma^2 & & \\ & \ddots & \\ & & \sigma^2 \end{bmatrix}$$ [Math. 28]

Where $\sigma$ is the standard deviation of the noise at the level of the points of interest.

Then the covariance of f is given by:

$$\Sigma_f = J_{A_F} \Sigma_\sigma J_{A_F}^T$$ [Math. 29]

Where $J_{A_F}$ is the Jacobean matrix of the matrix $A_F$ of the linear system used to find f.

It is now possible to compute the covariance matrix of the fundamental matrix designated $\Sigma_F$:

$$\Sigma_F = J_F \begin{bmatrix} \Sigma_f & 0 \\ 0 & 0 \end{bmatrix} J_F^T$$ [Math. 30]

Where $J_F$ is the Jacobean matrix of the singular value decomposition ("SVD") used to compute the fundamental matrix F.

The covariance of the essential matrix E designated $\Sigma_E$ is the covariance of F multiplied by a constant. It is therefore equal to covariance of F, i.e.:

$$\Sigma_E = \Sigma_F$$ [Math. 31]

The fifth step 500 can furthermore comprise a third sub-step 530 of propagating the noise of the essential matrix E at the intermediate values of translation $t_{2D}$ and of rotation $R_{2D}$. The third sub-step 530 can be carried out by determining the covariance of the said intermediate rotation and the covariance of the said intermediate translation.

By way of example, the intermediate rotation and the intermediate translation can be deduced from the essential matrix E on the basis of its singular value decomposition:

$$E = USV^T$$ [Math. 32]

Then the intermediate rotation $R_{2D}$ is given by:

$$R_{2D} = UWV^T \text{ or } UW^T V^T$$ [Math. 33]

Where $$W = \begin{bmatrix} 0 & -1 & 0 \\ 1 & 0 & 0 \\ 0 & 0 & 1 \end{bmatrix}$$

Furthermore, the intermediate translation $t_{2D}$ is given by:

$$t_{2D} = \pm U(:,3) \text{ or } t = \pm UZU^T$$ [Math. 34]

Where $$Z = \begin{bmatrix} 0 & 1 & 0 \\ -1 & 0 & 0 \\ 0 & 0 & 0 \end{bmatrix}$$

The covariance of the intermediate rotation $\Sigma_{R_{2D}}$ is given by:

$$\Sigma_{R_{2D}} = \frac{\partial(UWV^T)}{\partial E} \Sigma_E \frac{\partial(UWV^T)^T}{\partial E}$$ [Math. 35]

And the derivative of $UWV^T$ is given by:

$$\frac{\partial(UWV^T)}{\partial e_{ij}} = \frac{\partial U}{\partial e_{ij}} WV^T + UW \frac{\partial V^T}{\partial e_{ij}}$$ [Math. 36]

Where $e_{ij}$ are the elements of the essential matrix E

The covariance of the intermediate translation $\Sigma_{t_{2D}}$ is given by:

$$\Sigma_{t_{2D}} = \frac{\partial(U_3)}{\partial E} \Sigma_E \frac{\partial(U_3)^T}{\partial E}$$ [Math. 37]

where $$U_3 = U(:,3).$$

The fifth step 500 can furthermore comprise a fourth sub-step 540 of propagating the noise of the intermediate values of translation $t_{2D}$ and of rotation $R_{2D}$ at the first 3D points X.

By way of example, it has been seen above that a 3D point could be obtained by a triangulation method, in the following manner:

$$P1 \wedge C_1 X = 0 \qquad \text{[Math. 10]}$$

$$P2 \wedge C_2 X = 0 \qquad \text{[Math. 11]}$$

Where $P1 = [x_1 \ y_1 \ 1]^T$ and $P2 = [x_2 \ y_2 \ 1]^T$ are the points of interest in the first and second images I1 and I2 and X is a 3D point.

The problem can be written as a linear system:

$$A_X X = 0 \qquad \text{[Math. 38]}$$

where $$A_X = \begin{bmatrix} P1 \times C_1 \\ P2 \times C_2 \end{bmatrix}$$

is the matrix of the linear system used to find a 3D point X.

On the basis of the singular value decomposition of $A_X$ as follows:

$$A_X = USV^T; \qquad \text{[Math. 39]}$$

The solution X is given by the last column of V i.e. $X = V(:,4)$. It is designated $V_4 = V(:,4)$.

The equation $A_X X = 0$ configures an implicit function. The covariance of X is therefore given by:

$$J_X \Sigma_X J_X^T = J_{A_X} \Sigma_{A_X} J_{A_X}^T \qquad \text{[Math. 40]}$$

Where $J_X$ is the Jacobean of the singular value decomposition of the solution of X obtained by triangulation, $\Sigma_X$ is the covariance of the 3D point X, $\Sigma_{A_X}$ is the covariance matrix composed of the covariances of the points in the images, of the covariance of the intermediate rotation and intermediate translation and $J_{A_X}$ is its Jacobean.

In a simplified manner, the covariance $\Sigma_X$ can be found by carrying out the following inversion of $J_X$:

$$\Sigma_X = J_X^{-1} J_{A_X} \Sigma_{A_X} J_{A_X}^T (J_X^{-1})^T \qquad \text{[Math. 41]}$$

More rigorously, the covariance $\Sigma_X$ can be found on the basis of the solution of the system of linear equations $A_X X = 0$ and X given by $V_4 = V(:,4)$ so as to obtain the solution:

$$\Sigma_X = \frac{\partial V_4}{\partial a_{ij}} J_{A_X} \Sigma_{A_X} J_{A_X}^T \frac{D V_4^T}{\partial a_{ij}} \qquad \text{[Math. 42]}$$

Where $a_{ij}$ are the elements of the matrix $A_X$

The fifth step 500 can furthermore comprise a fifth sub-step 550 of propagation between the first 3D points obtained by triangulation and the distances di obtained by the P3P or the PnP.

For example, the P3P or the PnP problem can be determined as indicated above by the system of equations:

$$\begin{cases} d_1^2 + d_2^2 - 2d_1 d_2 \cos\theta_{12} = d_{12}^2 \\ d_1^2 + d_3^2 - 2d_1 d_3 \cos\theta_{13} = d_{13}^2 \\ d_2^2 + d_3^2 - 2d_2 d_3 \cos\theta_{23} = d_{23}^2 \end{cases} \qquad \text{[Math. 12]}$$

This resulting in the following system of linear equations:

$$\begin{bmatrix} a_1^1 & a_2^1 & a_3^1 & a_4^1 & a_5^1 \\ a_1^2 & a_2^2 & a_3^2 & a_4^2 & a_5^2 \\ \vdots & \vdots & \vdots & \vdots & \vdots \\ a_1^5 & a_2^5 & a_3^5 & a_4^5 & a_5^5 \end{bmatrix} \begin{bmatrix} 1 \\ d_1 \\ d_1^2 \\ d_1^3 \\ d_1^4 \end{bmatrix} = A_d d = 0 \qquad \text{[Math. 16]}$$

Where the coefficients $a_i^j$ of the matrix $A_d$ are dependent on $d_{ij}$ and on $\cos\theta_{ij}$.

On the basis of the singular value decomposition $A_d = USV^T$, the solution d is given by:

$$d = V(:,5).$$

As it is an implicit function, the covariance $\Sigma_d$ of the solution of d can be computed as follows:

$$\Sigma_d = \frac{\partial (V_5)}{\partial A_d} J_{A_d} \Sigma_{A_d} J_{A_d}^T \frac{\partial (V_5)^T}{\partial A_d} \qquad \text{[Math. 43]}$$

Where $V_5 = V(:,5)$ and where $J_{A_d}$ is the Jacobean matrix of $A_d$ and $\Sigma_{A_d}$ its covariance.

The problem consists in determining $J_{A_d} \Sigma_{A_d} J_{A_d}^T$, with $\Sigma_{A_d}$ given by:

$$\Sigma_{A_d} = \begin{bmatrix} diag(\sigma^2) & 0 \\ 0 & \Sigma_{\tilde{X}} \end{bmatrix} \qquad \text{[Math. 44]}$$

Where $\sigma$ is the standard deviation of the noise applied at points of interest in one of the images.

The fifth step 500 can thereafter comprise a sixth sub-step 560 of propagating the noise at the second 3D points $\tilde{X}_i$ which are determined on the basis of the distances $d_i$ and of points $P3_i$ in a third image I3, as indicated above, through the formula:

$$\tilde{X}_i = d_i \frac{K^{-1} P3_i}{\|K^{-1} P3_i\|} \qquad \text{[Math. 19]}$$

The computation of the covariance $\Sigma_{\tilde{X}}$ of the second 3D points $\tilde{X}_i$ on the basis of the covariance of the distances $\Sigma_d$ is as follows:

$$\Sigma_{\tilde{X}} = J_{\tilde{X}} \begin{bmatrix} \Sigma_d & \\ & diag(\sigma^2) \end{bmatrix} J_{\tilde{X}}^T \qquad \text{[Math. 45]}$$

Where $$J_{\tilde{X}} = \begin{bmatrix} \frac{\partial \tilde{X}}{\partial d_1} & \frac{\partial \tilde{X}}{\partial d_2} & \cdots & \frac{\partial \tilde{X}}{\partial x_1} & \frac{\partial \tilde{X}}{\partial x_2} & \cdots \end{bmatrix}$$

is the Jacobean of the second 3D points $\tilde{X}$.

The fifth step 500 can thereafter comprise a seventh sub-step 570 of propagation of noise of the second points $\tilde{X}_i$ to the final translation and rotation values.

By way of example, and as described above, the determination of the rotation $R_{3D}$ and the translation $t_{3D}$ between the first 3D points $X_i$ and the second 3D points $\tilde{X}_i$ can be carried out by using the Procustes problem, which consists in solving the following equation:

$$\min_{R,t} \| R_{3D}\tilde{X}_i + t_{3D} - X_i \|^2 \qquad \text{[Math. 20]}$$

To solve the Procustes problem, the "barycentre" of the points $X_i$ and the "barycentre" of the points $\tilde{X}_i$ can be determined beforehand with the aid of the following formulae:

$$B_X = \frac{1}{N}\sum_{i=1}^{N} X_i \qquad \text{[Math. 46]}$$

$$B_{\tilde{X}} = \frac{1}{N}\sum_{i=1}^{N} \tilde{X}_i \qquad \text{[Math. 47]}$$

Where N is the number of first and second 3D points (for example five first 3D points and five second 3D points).

The cross-covariance H between $B_X$ and $B_{\tilde{X}}$ is computed, given by the formula:

$$H = (\tilde{X} - B_{\tilde{X}})(X - B_X)^T \qquad \text{[Math. 48]}$$

If this cross-covariance is decomposed into singular values $H = USV^T$, the final rotation $R_{3D}$ is given by:

$$R_{3D} = UV^T \qquad \text{[Math. 49]}$$

The covariance $\Sigma_{R_{3D}}$ of the final rotation is given by the formula:

$$\Sigma_{R_{3D}} = \frac{\partial(UV^T)}{\partial H}\Sigma_H\frac{\partial(UV^T)^T}{\partial H} \qquad \text{[Math. 50]}$$

The derivative of $UV^T$ being given by:

$$\frac{\partial(UV^T)}{\partial h_{ij}} = \frac{\partial U}{\partial h_{ij}}V^T + U\frac{\partial V^T}{\partial h_{ij}} \qquad \text{[Math. 51]}$$

Where $h_{ij}$ are the elements of the matrix H
The covariance matrix $\Sigma_H$ is computed as follows:

$$\Sigma_H = J_H \begin{bmatrix} \Sigma_{\tilde{X}} & \\ & \Sigma_X \end{bmatrix} J_H^T \qquad \text{[Math. 52]}$$

Where $J_H$ is the Jacobean matrix of H.
Furthermore, the final translation $t_{3D}$ is given by:

$$t_{3D} = B_{\tilde{X}} - R_{3D}B_X \qquad \text{[Math. 53]}$$

It is therefore possible to perform its partial derivatives:

$$\frac{\partial t_{3D}}{\partial t_{ij}} = \frac{\partial B_{\tilde{X}}}{\partial t_{ij}} - R_{3D}\frac{\partial B_X}{\partial t_{ij}} - \frac{\partial R}{\partial t_{ij}}B_X \qquad \text{[Math. 54]}$$

The term $$\frac{\partial R_{3D}}{\partial t_{ij}}$$

is expanded as previously:

$$\frac{\partial R_{3D}}{\partial h_{ij}} = \frac{\partial(UV^T)}{\partial h_{ij}} = \frac{\partial U}{\partial h_{ij}}V^T + U\frac{\partial V^T}{\partial h_{ij}} \qquad \text{[Math. 55]}$$

Thus the covariance $\Sigma_{t_{3D}}$ of the final translation is given by:

$$\Sigma_{t_{3D}} = \left(\Sigma_{\tilde{X}} + R_{3D}\Sigma_X R_{3D}^T\right) + \frac{\partial(UV^T)}{\partial h_{ij}}\Sigma_X\frac{\partial(UV^T)^T}{\partial h_{ij}} \qquad \text{[Math. 56]}$$

Thus the covariance matrix of the final rotation and the covariance matrix of the final translation of the vision-based navigation system are obtained. According to the invention, such a matrix is referred to as "nominal covariance matrix of the translation" or "nominal covariance matrix of the rotation".

The integrity computation module 31 makes it possible to implement an integrity computation method (which can be referred to as "integrity algorithm"), and more precisely a method 600 for determining a protection radius of the vision-based navigation system.

When the integrity computation module 31 forms part of the processing unit 21, the integrity computation method can be integrated into the processing method (for example as a single algorithm). In this case, the method for determining a protection radius can be a sixth step 600 of a processing method 52, as is represented in FIG. 8. In particular, the integrity computation method can utilize steps and/or sub-steps of the vision algorithm, notably, but not exclusively, the fifth step of determining the covariance matrices of the final rotation and of the final translation.

According to the embodiment presented hereinafter, the method for computing a protection radius is based solely on the determination of covariance matrices of the final translation (and not on the determination of covariance matrices of the final rotation in addition to that of the final translation). In this case, the nominal covariance matrix of the translation is referred to for simplicity as the "nominal covariance matrix" or "nominal matrix".

Alternatively or complementarily, the method for computing a protection radius can be based on the determination of the covariance matrix of the rotation.

Furthermore, according to the embodiment presented, there are undertaken several covariance computations of the translation corresponding to i-th subsets, a subset being typically obtained by removing a set of points of interest and/or, if a set of several image sensors is used, by removing at least one sensor.

Thus, according to the embodiment presented, the principle of the method for determining the protection radius is to execute the vision algorithm so as to obtain a covariance sub-matrix of the final translation, doing so for a subset obtained by removing a set of points of interest and/or, if a set of several image sensors is used, by removing at least one image sensor. According to the invention, this matrix is referred to as the "covariance sub-matrix of the translation" or else for simplicity as the "covariance sub-matrix" or "sub-matrix".

It is thereafter possible to compare the sub-matrix with the nominal matrix. By repeating these operations several (M) times, several (M) covariance sub-matrices are obtained which are utilized to obtain a value of protection radius of the vision-based navigation system.

An exemplary method 600 for computing the protection radius can comprise the following steps, notably with reference to FIG. 8:
- a first step 610 of executing the vision algorithm so as to obtain a nominal covariance matrix $\Sigma_{t_{3D}}$ of the translation.

The nominal covariance matrix of the translation can be obtained with the aid of the steps and sub-steps described above in the present detailed description, and notably through the equation [Math.56].

Thereafter, the exemplary method 600 for computing the protection radius comprises, for each i-th subset Si with i varying between 1 and M, which is a subset corresponding to the vision-based navigation system for which an i-th part of the points of interest has been removed and/or, if a set of several image sensors is used, at least one i-th sensor has been removed:
- a second step 620 of executing the vision algorithm so as to obtain an i-th covariance sub-matrix of the translation $\Sigma_{t_{Si}}$ (that may be referred to as the "i-th covariance sub-matrix" or "i-th sub-matrix");
- a third step 630 of determining an i-th protection radius $D_i$ which can comprise the following sub-steps:
  a first sub-step 631 of determining an i-th matrix $\Delta_i$ of the differences between the nominal matrix and the i-th sub-matrix, i.e. $\Delta_i = \Sigma_t - \Sigma_{t_{Si}}$ (that may be referred to as the "i-th difference matrix"); a second sub-step 632 of computing the i-th largest value of standard deviation of the i-th difference matrix (that may be referred to as the "i-th difference standard deviation" or "i-th standard deviation of the differences"), i.e. $\sigma_{\Delta i} = \sqrt{\max(\lambda_{\Delta i}(\Delta_i))}$ where $\lambda\Delta i$ is the eigenvalue of the i-th difference matrix $\Delta_i$;
  preferably, a third sub-step 633 of computing an i-th corrected value $D_{\Delta i}$ equal to the i-th difference standard deviation $\sigma_{\Delta i}$ multiplied by a first weighting constant, i.e. $D_{\Delta i} = a \times \sigma_{\Delta i}$ (that may be referred to as the "i-th corrected difference standard deviation" or "i-th corrected standard deviation of the differences") where a is the said first weighting constant;
  preferably, a fourth sub-step 634 of computing the i-th largest value of standard deviation of the i-th sub-matrix (that may be referred to as the "i-th standard deviation"), i.e. $\sigma_{Si} = \sqrt{\max(\lambda_{Si}(\Sigma_{t_{Si}}))}$ where $\lambda Si$ is the eigenvalue of the i-th degraded matrix $\Delta_{Si}$;
  preferably, a fifth sub-step 635 of computing an i-th corrected value $D_{Si}$ equal to the i-th standard deviation $\sigma_{Si}$ multiplied by a second weighting constant, i.e. $D_{Si} = b \times \sigma_{Si}$ (that may be referred to as the "i-th corrected sub-standard-deviation") where b is the said second weighting constant; a sixth sub-step 636 of computing the value of an i-th protection radius $D_i$ for the subset Si as being either the i-th, optionally corrected, difference standard deviation, or the sum of the i-th, optionally corrected, difference standard deviation and of the i-th, optionally corrected, standard deviation, i.e. for example $D_i = D_{\Delta i} + D_{Si}$.

Finally, the exemplary method 600 for computing the protection radius comprises:
- a fourth step 640 of computing the value of the protection radius D as being the largest of the protection radii obtained for the subsets $S_i$, i.e.

$$D = \max_{i=1...M} D_i.$$

The covariance sub-matrices of the translation can also be obtained with the aid of the steps and sub-steps described above in the present detailed description, doing so for each subset Si, and notably through the equation [Math.56].

In the case where the method for computing a protection radius takes into account the covariance of the rotation, the first to third steps of the said computation method which were described in the previous paragraphs, as well as the fourth step can be applied to the nominal covariance matrix of the rotation and to the covariance sub-matrices of the rotation, which can also be obtained with the aid of the steps and sub-steps described above in the present detailed description for the navigation system and for each subset Si, and notably the equation [Math.55].

The value of the first weighting constant a can be equal to 1 and in this case: $D_{\Delta i} = \sigma_{\Delta i}$.

Alternatively, the value of the first weighting constant a can be defined by the user. For example, this value of a can be obtained on the basis of the probability of false alarm (PFA) of the navigation system by using a $\chi^2$ distribution:

$$a^2 = FDF^{-1}\left(1 - \left(\frac{PFA}{M}\right), 1\right) = \left\{a^2 : PDF(a^2, 1) = \frac{PFA}{M}\right\} \quad [\text{Math. 57}]$$

Where PDF is the probability density function of the distribution $\chi^2$ and M is the number of subsets Si.

The value of the second weighting constant b can be equal to 1 and in this case $D_{Si} = \sigma_{Si}$ be equal to 0 and in this case $D(i) = D_{\Delta i}$.

Alternatively, the value of b can be defined by the user. For example the constant b can be obtained on the basis of the probability of non-detection (PND) of the navigation system by using a $\chi^2$ distribution:

$$b^2 = PDF^{-1}(1 - PND, 1) \quad [\text{Math. 58}]$$

Figure 7:
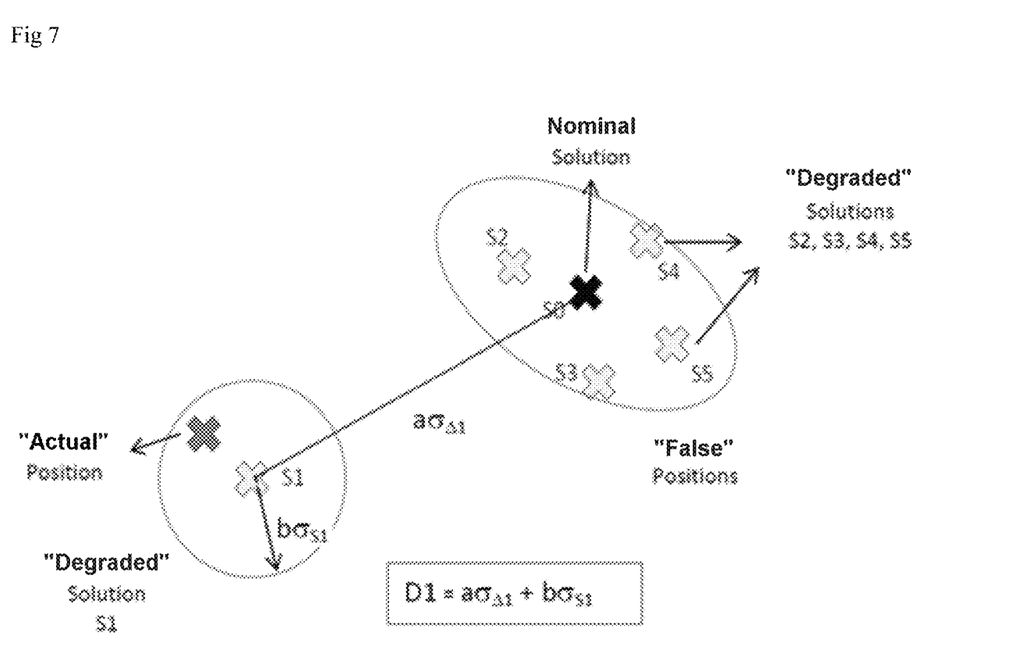
FIG. 7 illustrates a computation of a protection radius of a subset.

FIG. 7 illustrates an exemplary computation of the protection radius of a subset. In this simplified case, there are 5 subsets S1 to S5, the set S0 corresponding to the nominal navigation system, thereby corresponding in the example to the navigation system with all the points of interest. Computation of the protection radius $D_1$ of the subset $S_1$ gives $D1 = a\sigma\Delta1 + b\sigma S1$.

The same computation is done for each other subset S2 to S5.

It turns out in this example that when points of interest are omitted to obtain the subset $S_1$, then a result which is the closest to the actual position is obtained.

Thus the method according to the invention makes it possible to determine a value of the protection radius of the vision-based navigation system. This allows for example a body in motion to navigate with trustworthy position information so as to avoid fixed obstacles (mountainous relief, the buildings of a town, etc.) and mobile obstacles (aircraft, vehicles, pedestrians, etc.).

The precision of this determination depends on the number M and on the selection of the subsets, which can be determined as a function of the navigation system (and therefore of the processing method) implemented.

The method according to the invention can be adapted as a function of the navigation system implemented, since the principle of the method is to compute uncertainties of the motion values obtained by the processing method (whatever the method). The mode of computation of these uncertainties can be done in ways other than those indicated previously, and the person skilled in the art working in the field of the invention will be able to adapt the mode of computation of the uncertainties as a function of the processing method used.

It is very advantageous to be able to know in a precise manner the protection radius of the vision-based navigation system. The precision sought depends notably on the field for which the navigation system is intended.

The method according to the invention applies whatever the vision-based navigation system implemented: onboard, fixed, a sensor, several sensors, etc.

The method according to the invention makes it possible to guarantee or to verify whether a vision-based navigation system meets the constraints, norms and/or standards of use in certain fields of application, some of which can be particularly demanding.

The fields of application of the invention can be, inter alia, those of aeronautical navigation, terrestrial navigation, space navigation, maritime and underwater navigation.

In particular, a vision-based navigation system can serve as relay navigation system when a satellite navigation system can no longer be used (for example for ground navigation for an aeroplane) or when it has failed (for example for navigation by altitude for an aeroplane in case of loss of one or more satellites).

A vision-based navigation system can also be a main navigation system, for example when it is required to avoid any risk of masking, of jamming (for example for the delivery of parcels by drone).

The method according to the invention makes it possible furthermore to know whether it is necessary to correct the software (parameters in the vision algorithm, etc.) or to improve the hardware (camera, etc.).

The various modes (steps, sub-steps, examples, variants, etc.) presented can be combined together.

Furthermore, the present invention is not limited to the embodiments described above but extends to any embodiment entering within the scope of the claims.

The invention claimed is:

1. A method for determining a protection radius of a vision-based navigation system, the system comprising:
    at least one image sensor able to produce at least one first image at a first instant and a second image at a second instant; and
    a processing unit coupled to each image sensor and able to implement a processing method able to determine at least one value of motion between the first instant and the second instant on the basis of the first image and of the second image and of a plurality of image data determined on the at least first and second images;
    the method for determining a protection radius comprising the following steps:
    a first step of determining at least one nominal value of uncertainty of the at least one motion value obtained by the processing method for a set (S) comprising the plurality of image data determined;
    a second step of determining i-th sub-values of uncertainty of the at least one motion value determined by the processing method for an i-th subset (Si) defined by removing an i-th part of the image data determined;
    a third step of determining an i-th protection radius (Di) for the i-th subset (Si) on the basis of the i-th uncertainty sub-values and of the at least one nominal uncertainty value;
    the second and third steps being repeated for each i-th subset (Si), i varying between 1 and a defined value M;
    a fourth step of determining a protection radius (D) on the basis of the M i-th protection radii (Di) determined.

2. The method according to claim 1, the protection radius being the largest among the M i-th protection radii (Di) determined.

3. The method according to claim 1, the third step comprising:
    a first sub-step of determining the i-th differences between the i-th uncertainty sub-values and the at least one nominal uncertainty value; and
    a second sub-step of determining an i-th standard deviation of the differences as being the largest value of standard deviation of the i-th differences;
    the i-th protection radius (Di) being determined on the basis of the i-th standard deviation of the differences.

4. The method according to claim 3, the third step further comprising:
    a third sub-step of determining a corrected i-th standard deviation of the differences, as being the i-th standard deviation of the differences, multiplied by a first weighting constant (a);
    the i-th protection radius (Di) being determined on the basis of the corrected i-th standard deviation of the differences.

5. The method according to claim 4, the value of the first weighting constant (a) being obtained on the basis of the probability of false alarm of the vision-based navigation system, for example by using an inverse probability density function of the distribution.

6. The method according to claim 3, the third step further comprising:
    a fourth sub-step of determining an i-th standard deviation of the i-th subset (Si) as being the largest value of standard deviation of the i-th uncertainty sub-values;
    the i-th protection radius (Di) being determined on the basis of a sum between the i-th standard deviation of the differences or the corrected i-th standard deviation of the differences and the i-th standard deviation.

7. The method according to claim 6, the third step further comprising:
    a fifth sub-step of determining an i-th corrected standard deviation, as being the i-th standard deviation multiplied by a second weighting constant (b);
    the i-th protection radius (Di) being determined on the basis of a sum between the i-th standard deviation of the differences or the corrected i-th standard deviation of the differences and the i-th corrected standard deviation.

8. The method according to claim 7, the value of the second weighting constant (b) being obtained on the basis of the probability of non-detection of the vision-based navigation system, for example by using an inverse probability density function of the distribution.

9. The method according to claim 1, wherein the uncertainty values of at least one motion value are obtained by the processing method being defined by a covariance matrix of the said motion value.

10. The method according to claim 1, wherein the uncertainty values of at least one motion value are obtained by the processing method being determined by propagating the noise at the level of at least one from among the first and second images on the intermediate quantities required for the computation by the said processing method of the said motion value.

11. The method according to claim 10, wherein the uncertainty values of at least one motion value are obtained by the processing method being defined by a covariance matrix of the said motion value, further comprising a prior step of determining a covariance matrix of the at least one motion value obtained by the processing method, the said prior step comprising the following steps:
 a first sub-step of characterizing a noise ($\sigma$) at the level of at least one from among the first and the second image so as to obtain a covariance matrix ($\Sigma_o$) of the said noise; and
 at least one complementary sub-step of propagating the noise ($\sigma$) covariance matrix ($\Sigma_o$) obtained on the said motion value, the said at least one complementary sub-step being able to propagate the covariance matrix ($\Sigma_o$) of the noise ($\sigma$) on the intermediate quantities required for the computation of the at least one motion value by the processing method.

12. The method according to claim 11, the processing method comprising the following steps:
 a first step of acquiring at least one first and one second images further comprising the acquisition of at least one third image;
 a second step of determining at least one intermediate value of motion between at least one first and one second image, comprising a sub-step of selecting points of interest common to the said first and second images;
 a third step of determining points in space corresponding to points of interest common to the first and second images;
 a fourth step of determining at least one final motion value on the basis of the points in space determined and of points of interest in the at least one third image; and
 the at least one complementary sub-step of propagating the covariance matrix ($\Sigma_o$) of the noise ($\sigma$) on the motion value comprising:
  a sub-step of propagating the covariance matrix ($\Sigma_o$) of the noise ($\sigma$) at the at least one intermediate motion value;
  a sub-step of propagating the covariance matrix of the at least one intermediate motion value at the points in space;
  a sub-step of propagating the covariance matrix of the points in space at the at least one final motion value.

13. The method according to claim 1, at least one motion value being a rotation value and/or a translation value.

14. The method according to claim 1, the image data comprising coordinates of a plurality of points of interest on at least the first and second images.

15. A processing method able to determine at least one value of motion between a first instant and a second instant on the basis of a first image taken at the first instant, of a second image taken at the second instant and of a plurality of image data determined on the at least first and second images, further comprising the method for determining a protection radius according to claim 1.

16. A vision system comprising:
 at least one image sensor able to produce at least one first image at a first instant and a second image at a second instant; and
 a processing unit coupled to the image sensor and able to implement the processing method according to claim 15.

* * * * *